United States Patent Office 3,426,098
Patented Feb. 4, 1969

3,426,098
POLYESTER-POLYIMIDE WIRE ENAMEL
John F. Meyer, Schenectady, Howard E. Sheffer, Burnt Hills, and Edmund J. Zalewski, Rotterdam, N.Y., assignors to Schenectady Chemicals, Inc., Schenectady, N.Y., a corporation of New York
No Drawing. Filed May 20, 1965, Ser. No. 457,474
U.S. Cl. 260—841
Int. Cl. C08g 41/00; H01b 3/42
20 Claims

ABSTRACT OF THE DISCLOSURE

A polyester-polyimide is prepared from (1) tris (2-hydroxyethyl) isocyanurate, (2) a polycarboxylic acid, e.g., terephthalic acid or isophthalic acid, (3) an aromatic diamine, e.g., oxydianiline or methylene dianiline and (4) an aromatic carboxylic anhydride containing at least one additional carboxyl group, e.g., trimellitic anhydride or pyromellitic anhydride. The polyester-polyimide is employed to coat an electrical conductor.

---

The present invention relates to novel polyester-polyimides and wire enamels made therefrom.

It is an object of the present invention to prepare novel polyester polyimides.

Another object is to prepare novel wire enamels containing polyester-polyimides.

An additional object is to prepare electrical conductors having improved high temperature resistant coatings.

A further object is to prepare wire enamels having unusually good flexibility aging and heat shock as compared to presently available polyester wire enamels.

Another object of this invention is to prepare heat resistant wire enamels that have good heat shock at 200° C. without the use of a topcoat such as polyethylene terephthalate.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a polyester-polyimide containing tris (2-hydroxyethyl) isocyanurate (THEI) as a significant portion of the polyester. When glycerine is employed in place of THEI the best wire enamels have a heat life of 20,000 hours at 170–180° C. in the AIEE No. 57 twisted pair test. In contrast wire enamels made according to the present invention on the same test fail in the 180–230° C. class depending on the tris (2-hydroxyethyl) isocyanurate content. In general the more THEI, the higher the rating in this test. Increasing the THEI content not only improves the heat life of the polyester-polyimide but also retains the good heat shock properties. The polyimide can be preformed and then the polyester forming components added or all of the components can be added together.

The polyimide can be from 5 to 50% of the total of polyimide and polyester. Preferably the polyimide is 30 to 35% of the total. Good results have also been obtained where the polyimide was 10 to 20% of the total of the polyimide and polyester.

Unless otherwise indicated, all parts and percentages are by weight.

As the polyimide forming components there can be used (a) anhydrides such as trimellitic anhydride, pyromellitic dianhydride, benzophenone 2,3, 2',3'-tetracarboxylic dianhydride, 2,3,6,7-naphthalene dianhydride and 3,3',4,4' - diphenyl tetracarboxylic dianhydride and (b) polyamines, preferably aromatic amines, including methylene dianiline, benzidine, 3,3'-diaminodiphenyl, 1,4-diamino naphthalene, p-phenylene diamine, α·ω-nonamethylene diamine, 4,4'-diaminodiphenyl ether, 4,4-dimethyl heptamethylene diamine-1,7, diaminodiphenyl ketone, bis-(4-aminophenyl)-α,α'-p-xylene, m-phenylene diamine, xylene diamine, hexamethylene diamine, ethylene diamine, 4,4'-dicyclohexylmethane diamine, diaminodiphenyl sulfone. The preferred diamines are first methylene dianiline and second oxydianiline. Reactants (a) and (b) are usually employed in an amount of approximately 2 moles of (a) per mole of (b) to form the imide-acid. Generally 1.92 to 2.08 moles of the anhydride are used per mole of diamine although the anhydride can be used in excess. The reaction product of two moles of trimellitic anhydride and 1 mole of oxydianiline or methylene dianiline has the formula

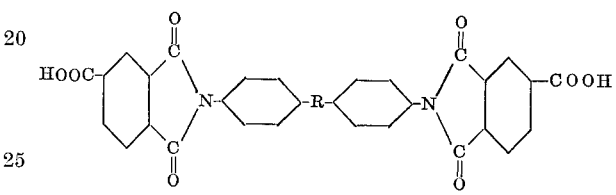

where R is 0 in the case of oxydianiline or $CH_2$ in the case of methylenedianiline.

The polyester forming ingredients include tris (2-hydroxyethyl) isocyanurate as the alcohol and terephthalic acid, isophthalic acid or benzophenone dicarboxylic acid as the acid. The preferred acid is benzophenone-4,4'-dicarboxylic acid.

A portion of the tris(2-hydroxyethyl) isocyanurate up to 80 equivalent percent of the total polyhydric alcohol can be replaced by another polyhydric alcohol such as ethylene glycol, glycerine, pentaerythritol, 1,1,1-trimethylolethane, 1,1,1-trimethylolpropane, sorbitol, mannitol, dipentaerythritol, butanediol-1,4, trimethylene glycol, propylene glycol, pentanediol-1,5-neopentylene glycol, butene-2-diol-1,4, butyne-2-diol-1,4,2,2,4,4-tetramethyl-1,3-cyclobutanediol, hydroquinone dibeta hydroxyethyl ether and 1,4-cyclohexane dimethanol. Preferably at least 50 equivalent percent of the total polyhydric alcohol is the THEI.

When a modifying alcohol is employed preferably it is a dihydric alcohol. Preferably the only alcohol present containing at least three hydroxyl groups is the tris(2-hydroxyethyl) isocyanurate.

A portion of the terephthalic acid, isophthalic acid or benzophenone dicarboxylic acid up to 50 equivalent percent of the total acid can be replaced by another polycarboxylic acid, e.g. adipic acid, ortho phthalic anhydride, hemimellitic acid, trimesic acid, trimellitic acid, succinic acid, tetrachlorophthalic anhydride, hexachloroendomethylene tetrahydrophthalic acid, maleic acid, sebacic acid. If the modifying acid has only two carboxyl groups and these are situated in imide forming position then the modifying acid is preferably added to the reaction mixture after the reaction of trimellitic anhydride (or other anhydride) with the methylene dianiline (or other diamine).

It should be realized of course, that any free acid or anhydride groups on the polyimide will also take part in the ester forming reaction.

The terephthalic acid, isophthalic acid and benzophenone dicarboxylic acid can also be used in admixture with each other.

The terephthalic acid, isophthalic acid or benzophenone dicarboxylic acid is usually reacted in the form of the dimethyl ester, e.g., as dimethyl terephthalate, 4,4'-dimethyl benzophenone dicarboxylate or dimethyl isophthalate, although the free acids can be used, or an acyl halide thereof, e.g., terephthaloyl chloride, or other alkyl esters, e.g., the ethyl or butyl esters or half esters, e.g., monomethyl terephthalate.

In making the polyester there preferably should be an excess of alcoholic groups over acid groups. Normally the number of hydroxyl groups on the alcohol component is 1 to 1.6 times the total number of carboxyl groups on the acid components.

The polyester wire enamel is usually modified by incorporation of 1 to 25% of a polyisocyanate based on the weight of the total of the polyisocyanate and polyester and/or by the incorporation of 0.01 to 10% of an alkyl titanate based on the total solids of the enamel.

As the polyisocyanate there can be used 2,4-tolylene diisocyanate, 2,6-tolylene diisocyanate, m-phenylene diisocyanate, 1,6-hexamethylene diisocyanate, the cyclic trimer of 2,6-tolylene diisocyanate, the trimer of 4,4'-diphenyl methane diisocyanate, 1,3,5-triisocyanato benzene, blocked isocyanates such as the reaction product of 3 mols of mixed 2,4- and 2,6-tolylene diisocyanate with trimethylol propane wherein the isocyanate groups are blocked by esterification with phenol (Mondur S), and Mondur SH wherein the mixed cyclic trimers of 2,4- and 2,6-tolylene diisocyanates have the three free isocyanate groups blocked by esterification with m-cresol. Other examples of suitable polyisocyanates, including blocked isocyanates are given in Sheffer et al. Patent 2,982,754 in column 1, line 41 to column 3, line 7.

Typical examples of suitable alkyl titanates include tetraisopropyl titanate, tetramethyl titanate, tetrabutyl titanate, terahexyl titanate and tetrapropyl titanate.

The polyester-polyimide forming reaction is normally carried out in the presence of the same solvents used to form the wire enamel. Thus, there can be used N-methyl pyrrolidone, dimethyl acetamide, dimethyl formamide, dimethyl sulfoxide, N-methyl caprolactan, xylene, cresylic acid, p-cresol, m-p-cresol mixture, dimethyl sulfone or the like. Mixtures of solvents can be used, e.g., blends of N-methyl pyrrolidone with dimethyl acetamide and/or dimethyl formamide, a mixture of N-methyl pyrrolidone, dimethyl acetamide and toluene (6:3:4), N-methyl pyrrolidone and xylene.

Both aliphatic and aromatic hydrocarbons can be used as diluents, e.g., aromatic naphthas such as Solvesso No. 100, toluene, xylene, octane, decane, dodecane and tetradecane. The addition of the higher boiling aliphatic hydrocarbons as part of the solvent improve the smoothness of the wire enamel.

Sometimes a metal drier is added in an amount of 0.2 to 1.0% metal based on the total solids in the enamel. Typical metal driers include zinc octoate, cadmium linoleate, zinc resinate, calcium octoate, cadmium naphthenate and zinc naphthenate.

There is preferably included in the wire enamel 1 to 5% based on the total solids of a melamine-formaldehyde resin or a phenolic resin such as phenol-formaldehyde, cresol-formaldehyde or xylenol-formaldehyde. The use of the phenolic resin is preferred over the melamine resin.

The polyester-polyimide is employed as a wire enamel while in solution in a solvent system such as those specified above. It is applied to an electrical conductor, e.g., copper, silver or stainless steel wire in conventional fashion. Thus, wire speeds of 15 to 32 feet/min. can be used with wire tower temperatures of 250 to 800° F., usually with a final temperature of above 500° F. The build up of enamel on the wire can be 0.0005 to 0.004 inch and in normal practice is about 0.003 inch (3 mils).

In place of applying the polyester-polyimide resin in a solvent to the electrical conductor the solvent can be removed from the resin and the wire or other electrical conductor in hot form passed through the powdered resin in the form of a fluidized bed in order to coat the resin on the wire or the like.

Example 1

To 192 grams (1 mole) of trimellitic anhydride in 300 cc. of N-methyl pyrrolidone there were added 100 grams (0.5 mole) of oxydianiline in 300 cc. of N-methyl pyrrolidone. An exothermic reaction took place and a clear solution was obtained. Then there was added 99 grams of tris (2-hydroxyethyl) isocyanurate, 165 grams of ethylene glycol, 388 dimethyl terephthalate and 0.0345 gram of litharge (catalyst). The mixture was heated to 440° F. and an orange solid became suspended in the mixture. Heating was continued until the mixture became clear (48–72 hours). The product was suitable for use as a wire enamel, e.g., for copper wire. To the final wire enamel solution there was added as a thinner a mixture of 40% p-chlorophenol, 40% phenol and 20% o-cresol to reduce the total solids to 25% and get a viscosity of ω (Gardner-Holdt). This product also could be coated on wire, e.g., by the die application procedure using No. 18 AWG copper wire and passing the coated wire through a wire tower at 750° F. at 27 feet/min.

Example 2

To 192 grams of trimellitic anhydride in 150 grams of N-methyl pyrrolidone at 200° F. there was slowly added a solution of 100 grams of oxydianiline in 150 grams of N-methyl pyrrolidone. There was then added a mixture of 254 grams of dimethyl terephthalate, 103 grams of ethylene glycol, 120 grams of tris (2-hydroxyethyl- isocyanurate, 50 grams of xylene and 0.15 gram of litharge. The temperature was increased over a period of 24 hours to 440° F., while methanol and xylene distilled off. When the viscosity of the batch was M at 30% solids 1800 grams of cresylic acid were added to give a viscosity of μ3/4 measured at 24% solids.

Finally this polyester-polyimide resin solution was mixed in the following fashion:

| | Grams |
|---|---|
| Polyester-polyimide at 24% solids | 840 |
| Tetraisopropyl titanate | 8 |
| 40% solution of Mondur SH in cresylic acid | 56 |
| Phenol-formaldehyde resin at 40% solids in cresylic acid | 25 |

After the other ingredients were added to the polyester-polyimide the mixture was heated to 250° F. and cooled. It was then run on copper wire in the wire tower at 750° F. in conventional fashion to give an enameled wire which had good electrical properties as shown by a comparison with a glycerine type commercial polyester imide wire enamel based on glycerine, terephthalic acid, trimellitic anhydride and methylene dianiline and modified with tetrabutyl titanate and zinc octoate.

| | Polyester-polyimide | Commercial material |
|---|---|---|
| Mandrel after snap | OK 2X | OK 2X |
| Flex aging at 175° F | OK 144 hrs. | F 96 hrs. |
| Heat shock 15% stretch, 200° C | OK 1X | OK 2X |
| Heat chock 15% stretch, 250° C | OK 4X | |
| Cut through temp., ° C | 312 | 290 |
| AIEE No. 57 heat life test, 260° C | 290 | 127 |
| Emerson scrape test | 14# | 12# |

The wire enamel of the present invention had superior flexibility and heat shock to the commercial enamel.

Examples 3–8

The procedures followed in Examples 3–8 were identical with those in Example 2. Half the N-methyl pyrrolidone was added with the trimellitic anhydride and the balance with the methylene dianiline or oxydianiline.

All of the polyester-polyimides of Examples 3–8 were mixed with tetraisopropyl titanate, Mondur SH and phenol-formaldehyde resin to give wire enamels having the same proportions of these materials as in Example 2. These enamels were then used to coat copper wire as in Example 2. When a topcoat was employed it was polyethylene terephthalate. The polyester-polyimide wire enamels of the present invention, however, are suitable for use without a topcoat.

| Example | 3 | 4 | 5 | 6 | 7 | 8 |
|---|---|---|---|---|---|---|
| Trimellitic anhydride | 768 | 384 | 288 | 192 | 192 | 96 |
| N-methyl pyrrolidone | 800 | 600 | 400 | 300 | 300 | 200 |
| Methylene dianiline | 396 | 199 | 148.5 | | | |
| Oxydianiline | | | | 100 | 100 | 50 |
| Dimethyl terephthalate | 1,016 | 776 | 1,020 | 254 | 388 | 340 |
| Ethylene glycol | 416 | 260 | 282 | 103 | 130 | 94 |
| Tris(2-hydroxyethyl)isocyanurate | 480 | 396 | 540 | 120 | 198 | 180 |
| Xylene | 200 | 200 | 300 | 50 | 100 | 100 |
| Litharge | 0.9 | 0.6 | 0.9 | 0.15 | 0.3 | 0.3 |
| Properties without topcoat: | | | | | | |
| Mandrel after snap | 2X | 4X | 2X | 2X | 2X | 2X |
| Flex aging at 175° F. (hrs.) | | | F24 | 264 | 264 | |
| Heat shock 15% stretch, 200° C | 1X | | [1]5X | 3X | 5X | 5X |
| Cut thru temp., ° C | 300 | | 310 | 312 | 300 | 303 |
| AIEE #57 heat life, 260° C | 122 | | 465 | 170 | 170 | 108 |
| AIEE #57 heat life, 240° C | 461 | | 816 | | | >2,141 |
| Emerson scrape (lbs.) | <20 | | | <14 | <20 | <20 |
| Mandrel after snap | 2X | | | 2X | | 2X |
| Flex aging at 175° F. (hrs.) | | | | F144 | | |
| Heat shock 15% stretch, 200° C | 1X | | | 1X | | 1X |
| Heat shock 15% stretch, 250° C | | | | 4X | | |
| Cut through temp., ° C | 270 | | | 308 | | 310 |
| AIEE #57 heat life, 260° C | 170 | | | 273 | | 320 |
| AIEE #57 heat life, 240° C | >1,579 | | | | | |
| Emerson scrape | <20 | | | 14 | | <20 |

[1] Over.

Examples 9–12

The procedures were carried out exactly as in Examples 2–8 except that in Example 11 the order of adding the ingredients was modified so that the methylene dianiline was the last material added to the pot (i.e., the polyimide was not formed prior to adding the polyester forming materials).

| Example | 9 | 10 | 11 | 12 |
|---|---|---|---|---|
| Trimellitic anhydride | 768 | 192 | 192 | 96 |
| Cresylic acid | | | 160 | |
| N-methylpyrrolidone | 800 | 160 | | 230 |
| Methylene dianiline | 396 | 99 | 99 | 49.5 |
| Dimethyl terephthalate | 1,016 | 254 | 254 | |
| Dimethyl benzophenone dicarboxylate | | | | 523 |
| Ethylene glycol | 416 | 60 | 60 | |
| Tris(2-hydroxyethyl)isocyanurate | 480 | 240 | 240 | 444 |
| Xylene | 200 | | | |
| Litharge | 0.9 | 0.15 | 0.15 | 0.3 |
| Properties without topcoat: | | | | |
| Mandrel after snap | 2X | 3X | 3X | 3X |
| Flex aging at 175° F. (hrs.) | OK 168 | OK 168 | OK 168 | OK 144 |
| Heat shock 15% stretch, 200° C | 1X | 3X | 3X | 2X |
| Cut through temp., ° C | 300 | 350 | 350 | 380 |
| AIEE #57 heat life, 260° C. (hrs.) | 130 | 600 | 660 | 878 |
| Extrapolated heat life to 20,000 hrs., temp., ° C | 180–190 | | | |
| Emerson scraps, lbs | 20 | 18 | 18 | 14 |

The use of 4,4'-dimethyl benzophenone dicarboxylate in place of dimethyl terephthalate improves both the cut through and heat life without sacrificing other mechanical or electrical properties of the wire enamel.

We claim:
1. A polyester-polyimide wherein at least 20% of the alcohol component is tris (2-hydroxyethyl) isocyanurate, the polyimide groups are 5 to 50% of the total of polyester and polyimide groups and the polyimide is a polyimide of reactants comprising (1) an aromatic diamine and (2) an aromatic carboxylic anhydride containing at least one additional carboxylic group.

2. An electrical conductor provided with a continuous coating of the polyester-polyimide of claim 1.

3. A polyester-polyimide according to claim 1 wherein the polyimide portion of the molecule has a member of the group consisting of benzene and naphthalene rings joined to two carbon atoms of a heterocyclic imide ring having 5 to 6 members in the ring, one of the atoms in the heterocyclic ring being a nitrogen atom and the balance of the atoms of the heterocyclic ring being carbon atoms.

4. An electrical conductor provided with a continuous coating of the polyester-polyimide of claim 3.

5. A polyester-polyimide according to claim 3 wherein a carboxyl group of the polyimide portion of the molecule is esterified with a polyhydric alcohol from the polyester portion of the molecule.

6. A polyester-polyimide of (1) an aromatic diamine, (2) an aromatic carboxylic anhydride containing at least one additional carboxyl group, (3) a member of the group consisting of terephthalic acid, isophthalic acid and benzophenone dicarboxylic acid and (4) a polyhydric alcohol component including at least 20% tris (2-hydroxyethyl) isocyanurate, the polyimide groups are 5 to 50% of the total of polyester and polyimide groups.

7. A polyester-polyimide according to claim 6 wherein any polyhydric alcohol component other than the tris (2-hydroxyethyl) isocyanurate is a dihydric alcohol.

8. A polyester-polyimide according to claim 6 wherein the anhydride is selected from the group consisting of trimellitic anhydride, pyromellitic anhydride and benzophenone tetracarboxylic dianhydride.

9. A polyester-polyimide according to claim 8 wherein the diamine is selected from the group consisting of oxydianiline and methylene dianiline.

10. A polyester-polyimide of (1) an aromatic diamine selected from the group consisting of oxydianiline and methylene dianiline, (2) trimellitic anhydride, (3) terephthalic acid and (4) a polyhydric alcohol component including at least 30% tris (2-hydroxyethyl) isocyanurate, any polyhydric alcohol component other than the isocyanurate being a lower alkanediol, the polyimide groups are 5 to 50% of the total of polyester and polyimide groups.

11. An electrical conductor coated with the polyester-polyimide of claim 10.

12. A polyester-polyimide of (1) an aromatic diamine selected from the group consisting of oxydianiline and methylene dianiline, (2) trimellitic anhydride, (3) benzophenone dicarboxylic acid and (4) a polyhydric alcohol component including at least 30% tris (2-hydroxyethyl) isocyanurate, any polyhydric alcohol component other than the cyanurate being a lower alkanediol, the polyimide groups are 5 to 50% of the total of polyester and polyimide groups.

13. An electrical conductor coated with the polyester-polyimide of claim 12.

14. An electrical wire enamel including the polyester-polyimide of claim 1, an organic solvent and an alkyl titanate.

15. An electrical wire enamel including the polyester-polyimide of claim 1, an organic solvent and an organic polyisocyanate.

16. An electrical wire enamel including the polyester-polyimide of claim 1, an organic solvent and a member of the group consisting of melamineformaldehyde and phenol-formaldehyde resins.

17. An electrical wire enamel including the polyester-polyimide of claim 6, an organic solvent, an alkyl titanate, an organic polyisocyanate and a phenol-formaldehyde resin.

18. A polyester-polyimide according to claim 6 wherein the polyimide groups are 10 to 35% of the total of polyester and polyimide groups and the tris (2-hydroxyethyl)isocyanurate is at least 30% of the polyhydric alcohol component.

19. A polyester-polyimide according to claim 18 wherein the polyimide is 30 to 35% of the total of polyester and polyimide groups.

20. A polyester-polyimide according to claim 6 wherein the polyimide groups are 5 to 50% of the total of polyester and polyimide groups, the anhydride is employed in an amount of 2 moles per mole of diamine and the number of hydroxyl groups on the polyhydride alcohol is 1:1.6 times the total number of carboxylic groups on the acid components of the polyester.

References Cited

UNITED STATES PATENTS

| | | | |
|---|---|---|---|
| 3,190,856 | 6/1965 | Lavin et al. | 260—65 |
| 3,211,585 | 10/1965 | Meyer et al. | |
| 3,238,181 | 3/1966 | Anderson. | |
| 3,274,159 | 9/1966 | Kluiber. | |
| 3,297,785 | 1/1967 | George et al. | 117—232 |
| 3,306,771 | 2/1967 | Schmidt et al. | |

FOREIGN PATENTS 973,377 10/1964 Great Britain.

MURRAY TILLMAN, *Primary Examiner.*

J. C. BLEUTGE, *Assistant Examiner.*

U.S. Cl. X.R.

260—47, 65, 75, 850, 22, 30.8, 32.6, 33.4, 33.6; 117—221, 232

UNITED STATES PATENT OFFICE
CERTIFICATE OF CORRECTION

Patent No. 3,426,098                      February 4, 1969

John F. Meyer et al.

It is certified that error appears in the above identified patent and that said Letters Patent are hereby corrected as shown below:

Columns 5 and 6, first table, first column after line 17, "Emerson scrape (lbs.)" insert as a heading -- Properties with Topcoat --.

Signed and sealed this 24th day of March 1970.

(SEAL)
Attest:

Edward M. Fletcher, Jr.                   WILLIAM E. SCHUYLER, JR.
Attesting Officer                            Commissioner of Patents